Sept. 19, 1933.  H. C. GODMAN  1,927,399
MINIATURE AIRPLANE
Filed Nov. 2, 1932
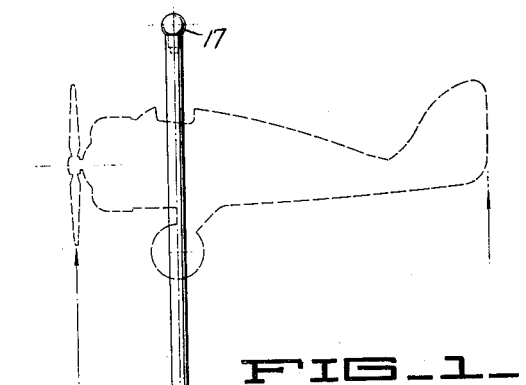
FIG_1_
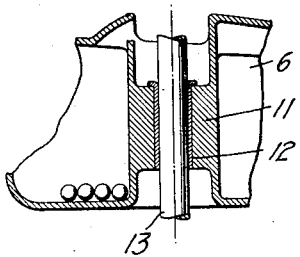
FIG_3_
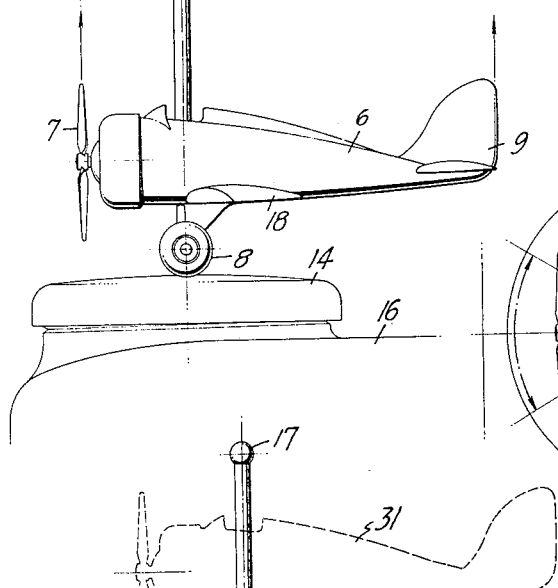
FIG_2_
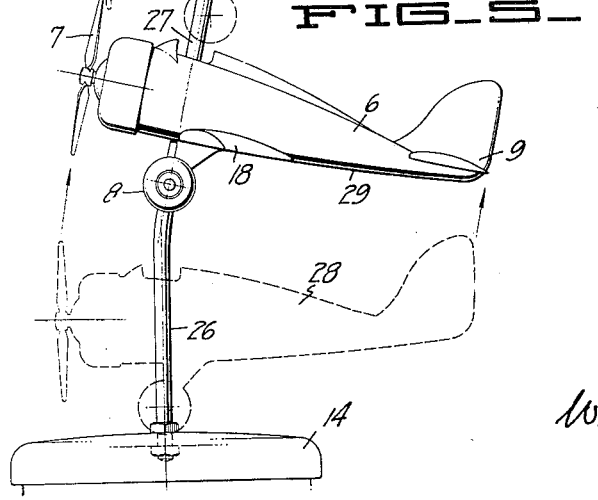
FIG_5_
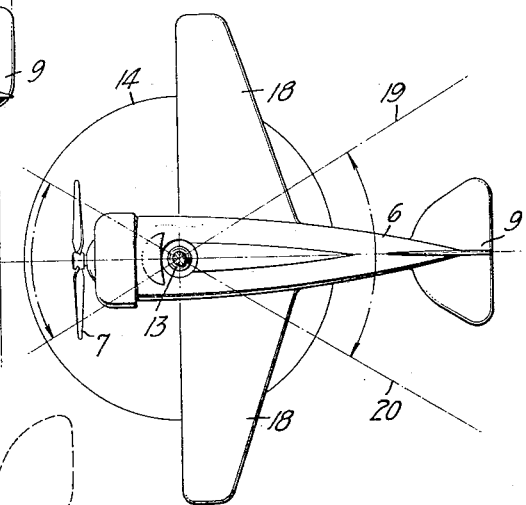
FIG_4_
INVENTOR.
Henry C. Godman
BY
White, Prost, Fehr & Lothrop
ATTORNEYS.

Patented Sept. 19, 1933

1,927,399

UNITED STATES PATENT OFFICE 1,927,399

MINIATURE AIRPLANE

Henry C. Godman, Palo Alto, Calif.

Application November 2, 1932. Serial No. 640,742

1 Claim. (Cl. 46—14)

My invention relates to a body structure simulating a miniature aircraft which is adapted to be mounted on a moving vehicle such as an automobile, and is adapted to ascend and descend with respect to its mounting.

An object of my invention is to provide a miniature airplane which affords a life-like representation of a full-sized airplane in flight.

Another object of my invention is to provide a miniature airplane which is capable of a simulation of flight within restricted limits.

Another object of my invention is to provide a relatively simple and cheap object of this character.

The foregoing and other objects are attained in the embodiment of the invention shown in the drawing, in which Figure 1 is a side elevation of the miniature airplane of my invention mounted on the radiator cap of an automobile.

Figure 2 is a plan of the structure shown in Figure 1.

Figure 3 is a cross section on a vertical longitudinal plane through the fuselage of my miniature airplane showing the internal construction.

Figure 4 is a cross section, similar to Figure 3, but showing a modified form of interior structure.

Figure 5 is a side elevation similar to Figure 1 but showing a modified form of supporting structure.

In its preferred form the miniature airplane of my invention comprises a body simulating an air craft or other selected object and adapted to be movably mounted on a vehicle so that the body simulates the flight of the aircraft or object when the vehicle is in motion.

Although the mechanism of my invention can be embodied in many different forms and although it preferably represents an aircraft, I have for illustration herein selected a body 6 which simulates a well-known form of monoplane. Preferably the body 6 at its forward end is provided with a propeller 7 in proper scale and rotatably mounted. The body is likewise equipped with wings or lifting surfaces 18 and with a miniature landing gear 8 and empennage 9. The interior of the body 6 is preferably hollow, as particularly indicated in Figure 3, and is suitably formed to provide a backing 11 for an anti-friction bushing 12. This bushing encompasses and is slidable on a rod 13 which is substantially vertical or upright and at its base is fastened to any suitable support or base such as the radiator cap 14 of an automobile 16. The upper end of the rod 13 is preferably enlarged or is provided with a ball 17 or other stop to limit the upward sliding movement of the body 6 with respect thereto, while the support 14 limits downward movement of the body.

With the device as described, when the automobile or other support 16 moves relative to the surrounding air, there is an upward force exerted on the body 6 through the lifting surfaces or wings 18 which impels the body to rise with respect to its support 14 and to lift or slide upwardly on the rod 13 an appropriate amount. The same relative air movement causes rotation of the propeller 7 to provide an especially lifelike appearance and an accurate simulation, while the fact that the bushing 12 provides not only a connection for relative sliding between the rod 13 and the body 6, but for relative rotation in a horizontal plane as well, permits the vagaries of the relatively moving air to orient the body 6 into various positions in a horizontal plane, always with the rod 13 as a center. The movement in a horizontal plane is particularly indicated in Figure 2, in which the major longitudinal axis of the body 6 is shown as occupying representative positions such as 19 and 20, due to causative, relative movement of the surrounding air.

While the rod as shown in Figure 1 is effective to prevent or restrict relative movement between the body 6 and the support 14 in the direction of movement of the automobile or vehicle 16, it is sometimes desired to provide a mechanism in which such movement is not entirely precluded and in which the angle of attack of the body 6 can be varied. Under these conditions the body 6 can be provided with a backing 21 which supports a bead or bearing 22 through which a rod 23, in most respects similar to the rod 13, passes for relative sliding movement, and with regard to which the rod can occupy various inclined positions, so that the angle of attack of the body 6 can vary in accordance with variations in lifting force.

As another modification, the support 14 can be provided with a rod 26 which, instead of being vertical throughout its entire length, is formed between its ends with an inclined portion 27, so that the body 6 when at rest, as indicated by the dotted line 28, is substantially horizontal. When the body begins to lift and rises on the rod, its angle of attack is changed, as indicated by the full lines 29. Again, as the body approaches the upper limit of its rising movement, its relationship to the rod causes it again to assume a substantially horizontal position, as indicated by the dotted line 31.

In accordance with the foregoing it is therefore possible to provide a body simulating an aircraft which is impelled to perform various gyrations and evolutions with respect to its support, which preferably is a moving vehicle, and which further is not only restricted to selected limits for its lifting movement, but is also restrained against movement in the direction in which the support or vehicle is advancing.

I claim:

A miniature airplane adapted to be mounted on a vehicle comprising a rod, circular in transverse cross-section, at one end secured to said vehicle and enlarged at its other end, said rod having substantially vertical portions adjacent each of said ends and an inclined portion between said ends, and a body simulating an aircraft slidably and rotatably mounted on said rod.

HENRY C. GODMAN.